(12) United States Patent
Iyer et al.

(10) Patent No.: US 9,183,171 B2
(45) Date of Patent: Nov. 10, 2015

(54) FAST DESKEW WHEN EXITING LOW-POWER PARTIAL-WIDTH HIGH SPEED LINK STATE

(71) Applicant: Intel Corporation, Santa Clara, CA (US)

(72) Inventors: Venkatraman Iyer, Austin, TX (US); Debendra Das Sharma, Saratoga, CA (US); Robert G. Blankenship, Tacoma, WA (US); Darren S. Jue, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 13/631,876

(22) Filed: Sep. 29, 2012

(65) Prior Publication Data

US 2014/0095751 A1    Apr. 3, 2014

(51) Int. Cl.
*G06F 1/32*    (2006.01)
*G06F 13/42*    (2006.01)
*G06F 13/38*    (2006.01)

(52) U.S. Cl.
CPC .............. *G06F 13/42* (2013.01); *G06F 1/3253* (2013.01); *G06F 13/38* (2013.01); *G06F 13/4265* (2013.01)

(58) Field of Classification Search
CPC ....... G06F 1/32; G06F 1/3203; G06F 1/3234; G06F 1/325; G06F 1/3253; G06F 13/38; G06F 13/40; G06F 13/4018; G06F 13/42; G06F 13/4204; G06F 13/4221; G06F 13/4265; G06F 13/4282
See application file for complete search history.

(56) References Cited

U.S. PATENT DOCUMENTS

| | | | |
|---|---|---|---|
| 5,396,635 | A | 3/1995 | Fung |
| 5,781,784 | A | 7/1998 | Mckinley |
| 6,009,488 | A | 12/1999 | Kavipurapu |
| 6,222,825 | B1 | 4/2001 | Mangin et al. |
| 6,484,223 | B1 | 11/2002 | Lenz |
| 6,526,469 | B1 | 2/2003 | Drehmel et al. |

(Continued)

FOREIGN PATENT DOCUMENTS

| CN | 104583944 A | 4/2015 |
|---|---|---|
| DE | 112013003766 T5 | 9/2015 |

(Continued)

OTHER PUBLICATIONS

International Search Report and Written Opinion for PCT Patent Application No. PCT/US2013/047251, mailed on Oct. 18, 2013, 9 pages.

(Continued)

*Primary Examiner* — Thomas J Cleary
(74) *Attorney, Agent, or Firm* — Alpine Technology Law Group LLC

(57) ABSTRACT

Methods and apparatus relating to fast deskew when exiting a low-power partial-width high speed link state are described. In one embodiment, an exit flit on active lanes and/or a wake signal/sequence on idle lanes may be transmitted at a first point in time to cause one or more idle lanes of a link to enter an active state. At a second point in time (following or otherwise subsequent to the first point in time), training sequences are transmitted over the one or more idle lanes of the link. And, the one or more idle lanes are deskewed in response to the training sequences and prior to a third point in time (following or otherwise subsequent to the second point in time). Other embodiments are also disclosed and claimed.

34 Claims, 7 Drawing Sheets

(56) References Cited

U.S. PATENT DOCUMENTS

| | | | |
|---|---|---|---|
| 6,665,742 B2 | 12/2003 | Owen et al. | |
| 7,136,953 B1 | 11/2006 | Bisson et al. | |
| 7,188,263 B1 | 3/2007 | Rubinstein et al. | |
| 7,313,712 B2 | 12/2007 | Cherukuri et al. | |
| 7,418,005 B2 | 8/2008 | Arima | |
| 7,660,261 B2 | 2/2010 | Keromytis et al. | |
| 7,664,146 B1 | 2/2010 | Reches | |
| 7,809,969 B2 * | 10/2010 | Das Sharma et al. | 713/324 |
| 8,046,488 B2 | 10/2011 | Cherukuri et al. | |
| 8,208,467 B2 | 6/2012 | Kapil et al. | |
| 8,868,955 B2 * | 10/2014 | Iyer et al. | 713/330 |
| 2002/0087716 A1 | 7/2002 | Mustafa | |
| 2002/0103945 A1 | 8/2002 | Owen et al. | |
| 2002/0112099 A1 | 8/2002 | Collier | |
| 2003/0088799 A1 | 5/2003 | Bodas | |
| 2003/0185308 A1 | 10/2003 | Schoenborn | |
| 2003/0196132 A1 * | 10/2003 | Chiang | 713/503 |
| 2003/0221026 A1 | 11/2003 | Newman | |
| 2004/0128576 A1 | 7/2004 | Gutman et al. | |
| 2004/0130347 A1 * | 7/2004 | Moll et al. | 326/62 |
| 2004/0153952 A1 | 8/2004 | Sharma et al. | |
| 2004/0264466 A1 | 12/2004 | Huang | |
| 2005/0188232 A1 | 8/2005 | Weng et al. | |
| 2005/0259599 A1 | 11/2005 | Cherukuri et al. | |
| 2005/0259696 A1 | 11/2005 | Steinman et al. | |
| 2005/0262284 A1 | 11/2005 | Cherukuri et al. | |
| 2006/0015761 A1 | 1/2006 | Kwa et al. | |
| 2006/0034295 A1 | 2/2006 | Cherukuri et al. | |
| 2006/0034611 A1 | 2/2006 | Li | |
| 2007/0239922 A1 | 10/2007 | Horigan | |
| 2008/0077793 A1 * | 3/2008 | Tan et al. | 713/168 |
| 2009/0276558 A1 | 11/2009 | Goma et al. | |
| 2010/0332786 A1 * | 12/2010 | Grohoski et al. | 711/207 |
| 2013/0007491 A1 | 1/2013 | Iyer et al. | |
| 2014/0085791 A1 * | 3/2014 | Hinck | 361/679.3 |

FOREIGN PATENT DOCUMENTS

| | | | |
|---|---|---|---|
| EP | 1599006 A1 | 11/2005 | |
| JP | 4-359335 A | 12/1992 | |
| JP | 8-223390 A | 8/1996 | |
| JP | 2000-261435 A | 9/2000 | |
| JP | 2001-022690 A | 1/2001 | |
| JP | 2002-259327 A | 9/2002 | |
| JP | 2003-037613 A | 2/2003 | |
| KR | 20150038265 A | 4/2015 | |
| WO | 2014/051765 A1 | 4/2014 | |

OTHER PUBLICATIONS

Office Action received for Chinese Patent Application No. 200410086986.5, mailed on Jun. 19, 2009, 5 pages of English Translation and 6 pages of Chinese Office Action.

Office Action received for Chinese Patent Application No. 2004100869865, mailed on Nov. 28, 2008, 4 pages of English Translation and 5 pages of Chinese Office Action.

Office Action received for Japanese Patent Application No. 2004-235926, mailed on Feb. 3, 2009, 9 pages of English Translation and 8 pages of Japanese Office Action.

Office Action received for Japanese Patent Application No. 2004-235926, mailed on Oct. 27, 2009, 6 pages of English Translation and 6 pages of Japanese Office Action.

Response to Office Action received for U.S. Appl. No. 11/155,857, filed on Mar. 30, 2009, 10 pages.

International Search Report and Written Opinion received for PCT Application No. PCT/US2006/024193, mailed on Feb. 1, 2007, 11 pages.

Office Action received for European Patent Application No. 04255079.8, mailed on Sep. 6, 2006, 10 pages.

Office Action received for European Patent Application No. 04255079.8, mailed on Nov. 28, 2008, 5 pages.

Office Action received for European Patent Application No. 04255079.8, mailed on Mar. 19, 2007, 4 pages.

PCI Express Base Specification, Revision 1.0, Jul. 22, 2002, Revised Version 1.0a on Apr. 15, 2003, pp. 1-8 and 165-189.

Search Report received for European Patent Application No. 04255079.8, mailed on Sep. 16, 2005, 3 pages.

Office Action received for U.S. Appl. No. 10/850,851, mailed on Feb. 4, 2009, 20 pages.

Office Action received for U.S. Appl. No. 10/850,851, mailed on Aug. 31, 2009, 27 pages.

Office Action received for U.S. Appl. No. 10/850,851, mailed on Feb. 2, 2010, 26 pages.

Office Action received for U.S. Appl. No. 10/850,851, mailed on Jul. 23, 2010, 21 pages.

Office Action received for U.S. Appl. No. 10/850,851, mailed on Dec. 15, 2010, 22 pages.

Ex Parte Quayle Action received for U.S. Appl. No. 10/850,851, mailed on May 23, 2011, 6 pages.

Notice of Allowance received for U.S. Appl. No. 10/850,851, mailed on Jun. 23, 2011, 6 pages.

Office Action received for U.S. Appl. No. 13/175,794, mailed on Dec. 17, 2013, 8 pages.

English Language Translation of an Office Action of JPO dated Jan. 29, 2008, pp. 1-4.

German Patent and Trademark Office, Office Action dated Oct. 29, 2008 in related application.

Notice of Grant received for Chinese Patent Application No. 200410086986.5, mailed on Feb. 5, 2010, 1 page of English translation and 2 pages of Chinese Notice of Grant.

Office Action received for Japanese Patent Application No. 2004-235926, mailed on Jan. 29, 2008, 4 pages of English translation.

Office Action received for German Patent Application No. 112006001541.9, mailed on Oct. 29, 2008, 3 pages of English translation and 3 pages of German Office Action.

Notice of Grant received for European Patent Application No. 04255079.8, mailed on Mar. 30, 2009, 6 pages.

Notice of Allowance received for U.S. Appl. No. 13/175,794, issued on Sep. 22, 2014.

International Preliminary Report on Patentability, received for International Application No. PCT/US2013/047251, mailed on Apr. 9, 2015.

* cited by examiner

FAST DESKEW WHEN EXITING LOW-POWER PARTIAL-WIDTH HIGH SPEED LINK STATE

FIELD

The present disclosure generally relates to the field of electronics. More particularly, some embodiments relate to fast deskew when exiting a low-power, partial-width high speed link state.

BACKGROUND

Computer systems are generally made up of components that communicate with each another for various purposes. Links that interconnect computer components provide a mechanism for transferring data and each link generally includes a plurality of "lanes", where each lane transfers a bit of data in a given cycle. The number of lanes to be used during communication generally defines the link width which in turn effectively controls the bandwidth of the link. As such, wider links provide a larger bandwidth than narrower links. On the other hand, wider links tend to consume more power because of the additional circuitry that supports the additional lanes. Also, power consumption, quality of service, or performance can become an issue when deciding link widths.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments are practiced without the specific details. In other instances, well-known methods, procedures, components, and circuits have not been described in detail so as not to obscure the particular embodiments. Various aspects of embodiments of the invention are performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

On serial links such as QPI (Quick Path Interconnect) or Keizer Technology Interconnect (KTI), there is a continuous flow of data flits across the width of the link (e.g., 20 lanes)—this state is called L0. During periods of low utilization, in order to save power, the flits may be funneled into a partial width (e.g., 8 lanes)—this state is called L0p. As utilization increases, the idle lanes have to be brought back up, trained (e.g., to ensure bit lock maintenance), re-deskewed, and merged seamlessly with the active lanes so that the link may return to a full operational state (e.g., L0). This exit from low power, reduced width state (e.g., from L0p to L0) needs to be very quick, so that performance is not adversely impacted. However, some implementations restrict low power residency to eliminate skew drift (which excessively consume power) or interrupt the flow of flits in order to perform the deskew and merger of the idle and active lanes (which reduces link performance and/or quality of service).

Some of the embodiments discussed herein provide for fast deskew when exiting a low-power partial width high speed link state. An embodiment operates without a forwarded clock. Accordingly, in the absence of a forwarded clock, some embodiments need to re-deskew the lanes on entering L0 (e.g., from L0p).

As discussed herein, "L0" generally refers to a link operating at full width (i.e., all lanes) in a direction and "L0p" generally refers to a link operating at partial width (i.e., a reduced number of lanes) in one direction. Additionally, the basic unit of transfer over a link is referred to herein as a "flit" (which is 80 bits in an embodiment, e.g., with 8 bits for error detection, 8 bits for link-layer header, and 64 bits for data, although other configurations can also be used).

Figure 1:
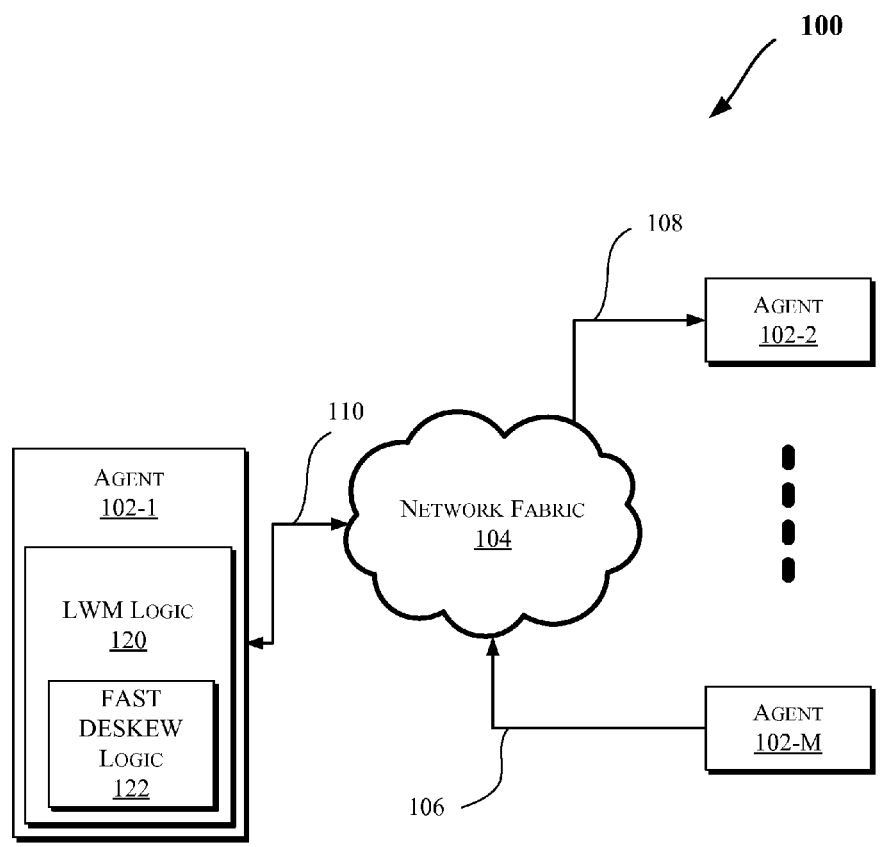
FIG. 1 illustrates a block diagram of and embodiment of a computing system, which may be utilized to implement various embodiments discussed herein.

Various embodiments are discussed herein with reference to a computing system component, such as the components discussed herein, e.g., with reference to FIGS. 1-2 and 6-7. More particularly, FIG. 1 illustrates a block diagram of a computing system 100, according to an embodiment of the invention. The system 100 includes one or more agents 102-1 through 102-M (collectively referred to herein as "agents 102" or more generally "agent 102"). In an embodiment, the agents 102 are components of a computing system, such as the computing systems discussed with reference to FIGS. 2 and 6-7.

As illustrated in FIG. 1, the agents 102 communicates via a network fabric 104. In an embodiment, the network fabric 104 includes one or more interconnects (or interconnection networks) that communicate via a serial (e.g., point-to-point) link and/or a shared communication network. For example, some embodiments facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information can be observed along the channel by channel traffic trace capture tools (such as one or more logic analyzers).

In one embodiment, the system 100 supports a layered protocol scheme, which includes a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 provides communication that adheres to one or more cache coherent protocols.

Furthermore, as shown by the direction of arrows in FIG. 1, the agents 102 transmit and/or receive data via the network fabric 104. Hence, some agents utilize a unidirectional link while others utilize a bidirectional link for communication. For instance, one or more agents (such as agent 102-M) transmit data (e.g., via a unidirectional link 106), other agent(s) (such as agent 102-2) receive data (e.g., via a unidirectional link 108), while some agent(s) (such as agent 102-1) can both transmit and receive data (e.g., via a bidirectional link 110).

Also, in accordance with an embodiment, one or more of the agents 102 include a Link Width Modulation (LWM) logic 120. In some embodiments, each CPU socket present in a computing system includes a LWM logic 120 as will be further discussed with reference to FIG. 2, for example. Also, one or more of the agents 102 may include a fast deskew logic 122 to facilitate fast deskew when changing state from L0p to L0, for example, as will discussed herein. As shown in FIG. 1, the logic 122 is included in the logic 120; however, embodiments of the invention are not limited to this implementation and logic 122 may be provided elsewhere in the system.

Figure 2:
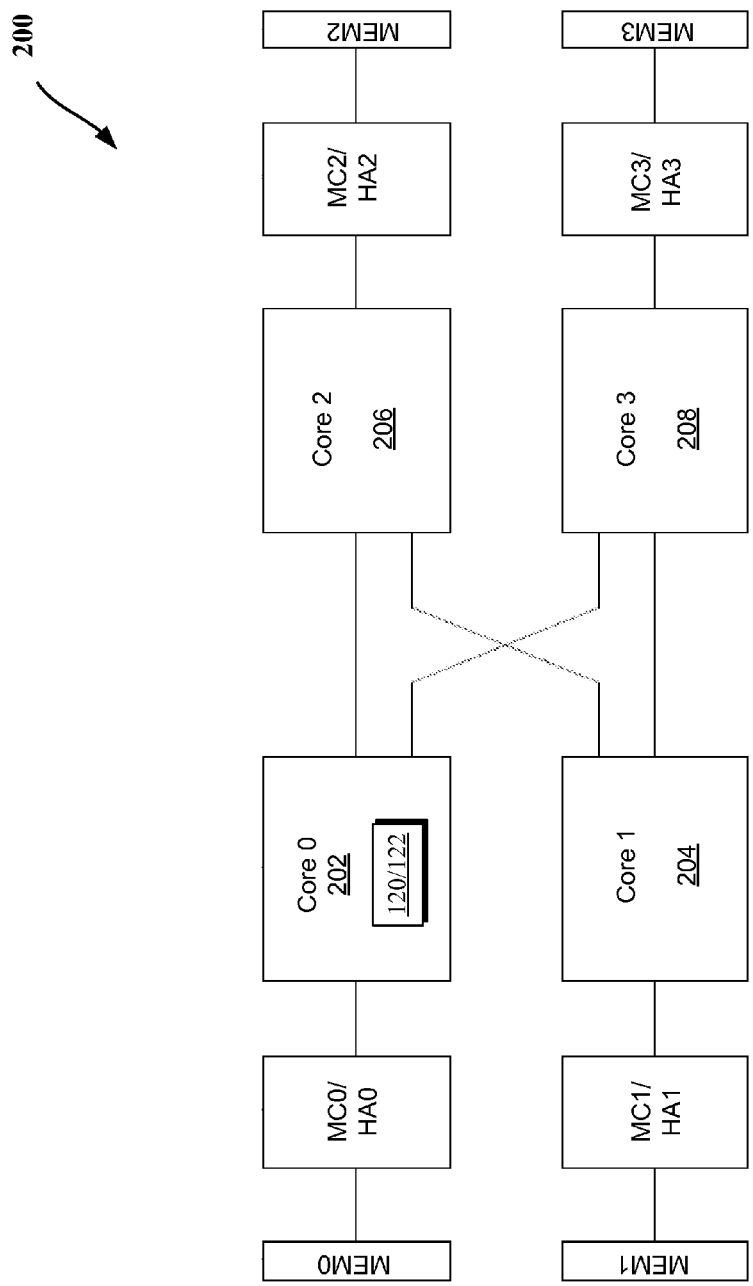
FIG. 2 illustrates a block diagram of and embodiment of a computing system, which may be utilized to implement various embodiments discussed herein.

More specifically, FIG. 2 is a block diagram of a computing system 200 in accordance with an embodiment. System 200 includes a plurality of sockets 202-208 (four shown but some embodiments have more or less socket(s)). One or more of the sockets include a processor, a LWM logic 120, and a fast deskew logic 122. Also, each socket may be coupled to the other sockets via a point-to-point (PtP) link, or a differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g., formed of a plurality of Dual Inline Memory Modules (DIMMs) that include dynamic random access memory (DRAM).

In another embodiment, the network fabric may be utilized for any System on Chip (SoC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect Express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a memory controller (MC)/Home Agent (HA) (such as MC0/HA0 through MC3/HA3). The memory controllers is coupled to a corresponding local memory (labeled as MEM0 through MEM3), which may be a portion of system memory (such as memory 612 of FIG. 6). In some embodiments, the memory controller (MC)/Home Agent (HA) (such as MC0/HA0 through MC3/HA3) are the same or similar to agent 102-1 of FIG. 1 and the memory, labeled as MEM0 through MEM3, are the same or similar to memory discussed with reference to any of the figures herein. Generally, processing/caching agents send requests to a home node for access to a memory address with which a corresponding "home agent" is associated. Also, in one embodiment, MEM0 through MEM3 are configured to mirror data, e.g., as master and slave. Also, one or more components of system 200 are included on the same integrated circuit die in some embodiments. An embodiment, such as shown in FIG. 2, is for a socket glueless configuration with mirroring. For example, data assigned to a memory controller (such as MCO/HA0) is mirrored to another memory controller (such as MC3/HA3) over the PtP links.

In some legacy systems, a complete link can be turned off to save power during idle periods. However, during periods of low utilization, it may be more efficient to operate the link at a lower width rather than shutting down the whole link (e.g., to reduce delay associated with restarting a link). To this end, the LWM logic 120 allows a link to be available for a longer period of time, e.g., while changing link widths. For example, a link transitions from a first width to a second width in response to a power management flit (which may not be a complete flit in some embodiments). Also, non-idle flits may continue to be transmitted over the link after transmission of the power management flit.

Moreover, links that interconnect computer components provide a mechanism for transferring data and each link may include a plurality of "lanes", where each lane transfers a bit of data in a given cycle. The number of lanes to be used during communication generally defines the link width which in turn effectively controls the bandwidth of the link. Each lane is a point-to-point link in an embodiment.

Figure 3:
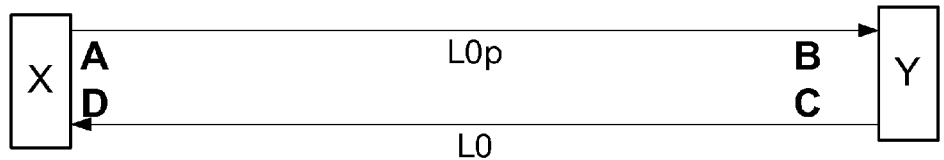
FIG. 3 illustrates a block diagram of a link pair, according to an embodiment.
Figure 4:
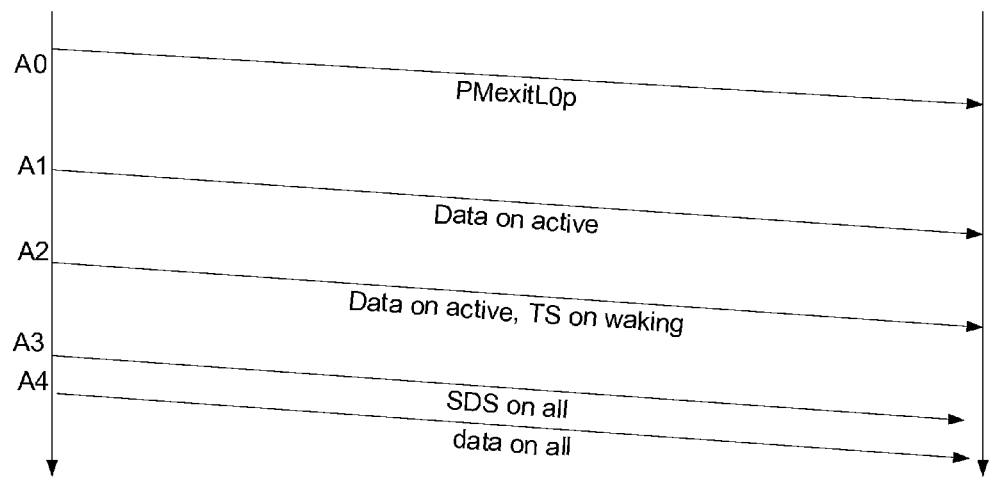
FIG. 4 illustrates a flow diagram to provide fast deskew, according to an embodiment.
Figure 5:
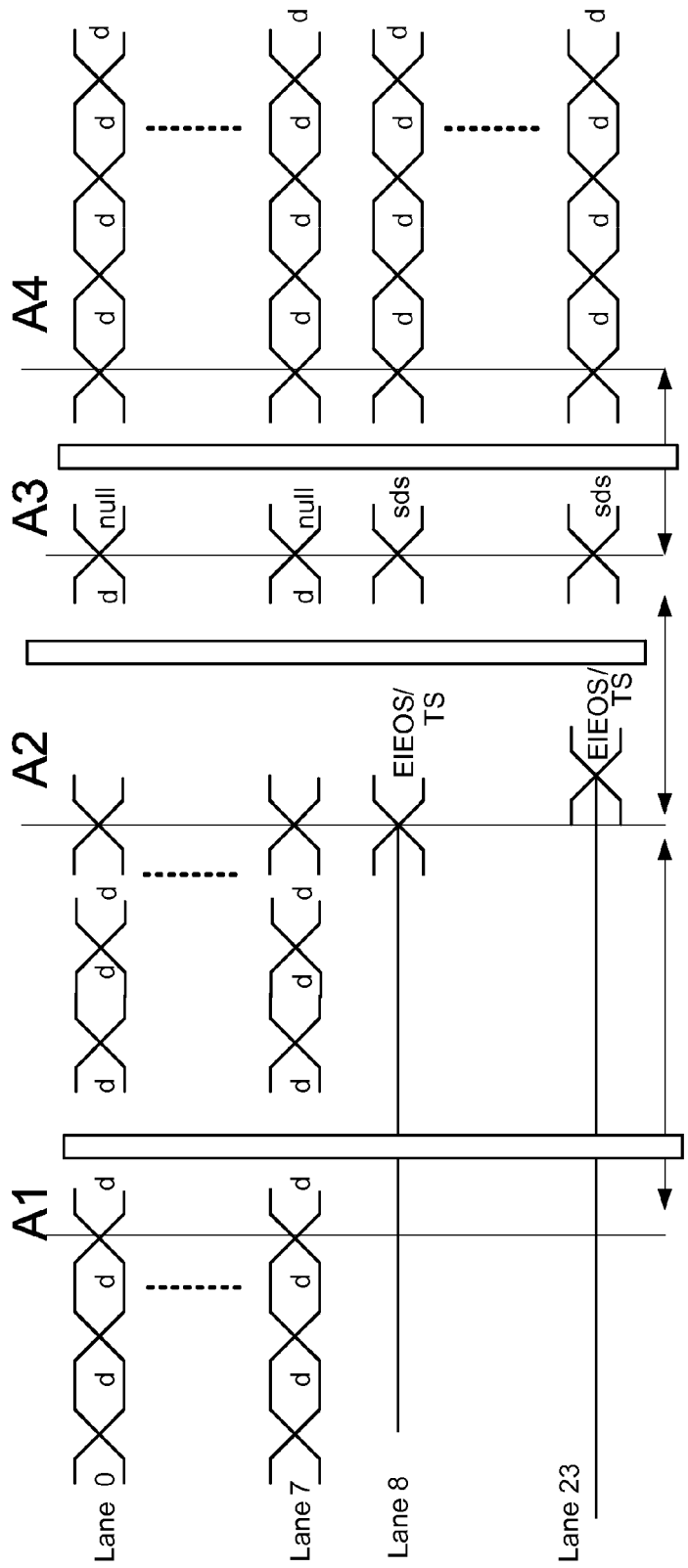
FIG. 5 illustrates a timing diagram according to an embodiment.

More specifically, FIG. 3 illustrates a block diagram of a link pair (e.g., between to agents X and Y with ports A-D, such as the agents 102 discussed with reference to FIG. 1) with one direction in L0p and the other in L0, according to an embodiment. FIG. 4 illustrates a flow diagram to provide fast deskew, according to an embodiment. FIG. 5 illustrates a timing diagram, according to an embodiment (where lanes 0-7 are active and lanes 8-23 are idle). "d" in the timing diagram refers to data and EIEOS refers to electrical Idle Exit Ordered Set.

Referring to FIGS. 3-5, to exit L0p, A sends an exit flit at time A0 (shown as PMexitL0p in FIG. 4), e.g., which acts as a wake signal to cause one or more idle lanes of the link to enter an active state and exit an L0p state. Alternatively A0 could be identified by special signaling (e.g., EIEOS) on idle lanes which is aligned to flit boundaries on active lanes. Also, A sends data or special flits on active lanes at time A1. As discussed herein, a "special" flit generally refers to a non-retry-able flit, such as a "null" flit. Also, null flits could start before the points shown (e.g. A1 etc.) and can extend after it. At a predetermined point (at time A2) thereafter, A starts sending Training Sequences (TS) on the idle lanes. At time A3, the training is presumed completed and Tx (Transmitter) (A) sends a Start Data Sequence (SDS) on all the lanes (e.g., via the fast deskew logic 122). This in turn completes deskewing of the lanes and merging them so that data is sent on all lanes at time A4. In an embodiment, port A is coupled to the fast deskew logic 122 to cause fast deskew when exiting L0p, including one or more operations discussed with reference to FIGS. 3-5.

Some implementations reduce the SDS period (A3-A4) since the link is completely unavailable at that time, which degrades performance. In one embodiment, the TS on the idle lanes are started coincidental with time A1 (or some multiple of TS length thereafter, e.g., by the fast deskew logic 122). Also, TS on the idle lanes may be started at the same time as time A1, simultaneous with time A1, contemporaneous to time A1, and/or related to time A1 or at least partially in parallel to data transfer on the active lanes at time A1, etc. The idle lanes are then deskewed between themselves (e.g., by the fast deskew logic 122) using the TS prior to time A3. The skew between the idle set and the active set of the lanes (which are deskewed among themselves) are determined prior to time A3 (e.g., by the fast deskew logic 122). At time A3, the set of active lanes and the set of idle lanes are merged. This merger may be done very quickly (i.e., using a very short SDS) since the deskew is already known. In an embodiment, a SDS is not needed and special (or data) flit(s) are used on active lanes.

Figure 8A:
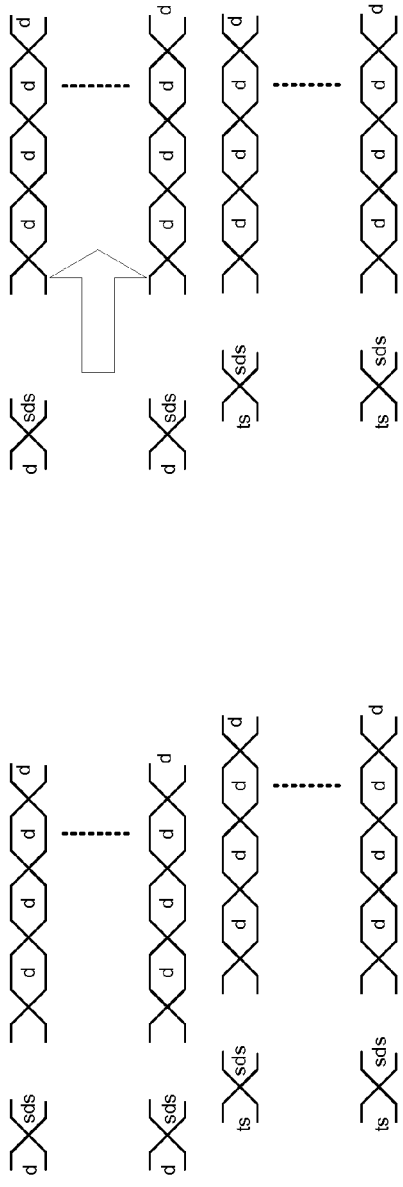
FIG. 8A illustrates a timing diagram according to an embodiment.
Figure 8B:
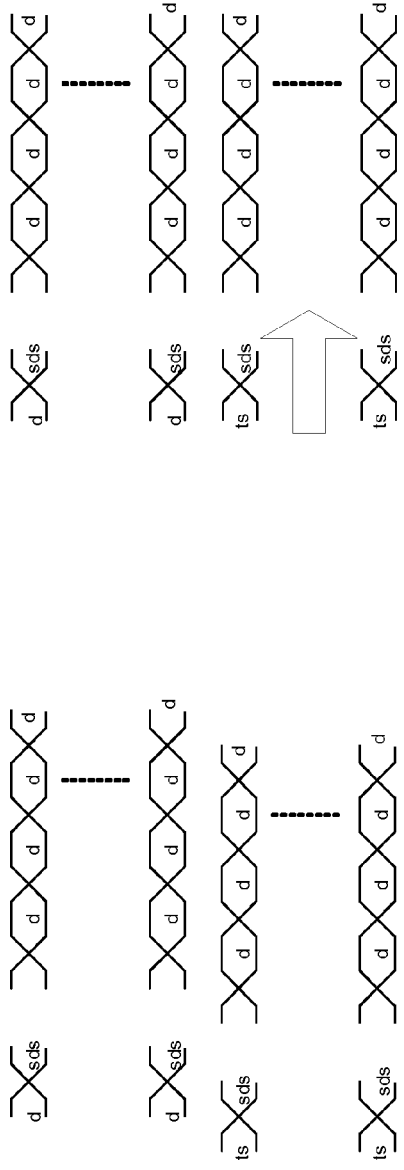
FIG. 8B illustrates a timing diagram according to an embodiment.

FIGS. 8A and 8B illustrate timing diagrams according to some embodiments. The relative skew between the active set and idles set could be either of the two cases shown at left of FIGS. 8A and 8B. In FIG. 8A, the idle set is slower than the active set and in FIG. 8B it is faster than the active set. In the former case, deskew can be achieved by adding delay into the active set or by removing some latency from the pipeline of the idle set in various embodiments. The second method can be more complex as it involves rearranging the alignment and latency buffers in the pipeline, but it avoids having to insert any delay or even the SDS on the active set. In FIG. 8B, the deskew can be achieved by simply adding delay to the idle set in an embodiment.

Figure 6:
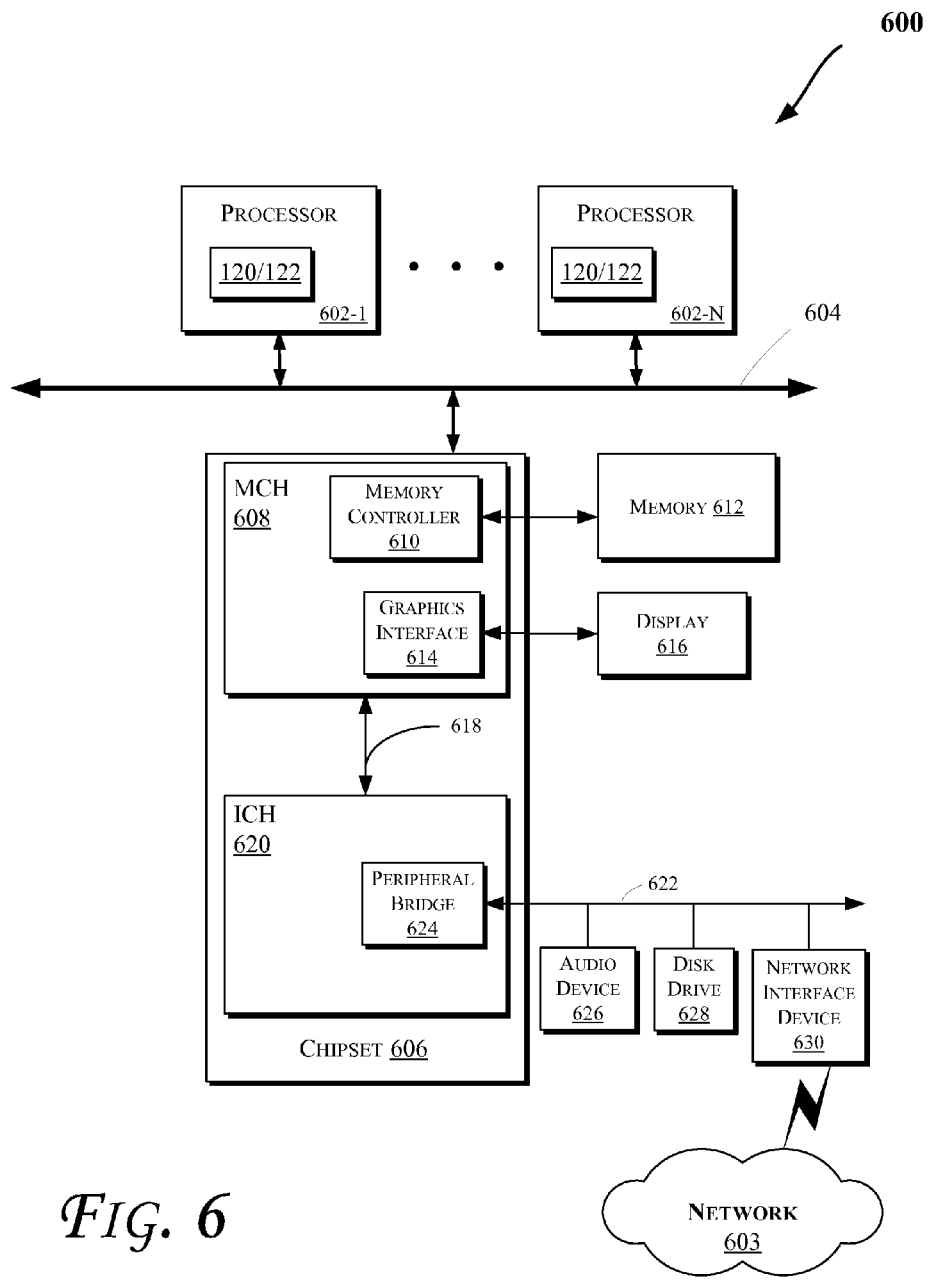
FIG. 6 illustrates a block diagram of and embodiment of a computing system, which may be utilized to implement various embodiments discussed herein.

FIG. 6 illustrates a block diagram of a computing system 600 in accordance with an embodiment of the invention. The computing system 600 includes one or more central processing unit(s) (CPUs) 602-1 through 602-N or processors (collectively referred to herein as "processors 602" or more generally "processor 602") that communicate via an interconnection network (or bus) 604. The processors 602 includes a general purpose processor, a network processor (that processes data communicated over a computer network 603), or other types of a processor (including a reduced instruction set computer (RISC) processor or a complex instruction set computer (CISC)).

Moreover, the processors 602 have a single or multiple core design. The processors 602 with a multiple core design integrate different types of processor cores on the same integrated circuit (IC) die. Also, the processors 602 with a multiple core design can be implemented as symmetrical or asymmetrical multiprocessors. Also, the operations discussed with reference to FIGS. 1-5 are performed by one or more components of the system 600. In some embodiments, the processors 602 are the same or similar to the processors 202-208 of FIG. 2. Furthermore, the processors 602 include the LWM logic 120 and/or fast deskew logic 122 in some embodiments.

A chipset 606 also communicates with the interconnection network 604. In an embodiment, the chipset 606 includes LWM logic 120 and/or logic 122. The chipset 606 includes a memory controller hub (MCH) 608. The MCH 608 includes a memory controller 610 that communicates with a memory 612. The memory 612 stores data, including sequences of instructions that are executed by the CPU 602, or any other device included in the computing system 600. For example, the memory 612 stores data corresponding to an operation system (OS). In one embodiment of the invention, the memory 612 includes one or more volatile storage (or memory) devices such as random access memory (RAM), dynamic RAM (DRAM), synchronous DRAM (SDRAM), static RAM (SRAM), or other types of storage devices. Non-volatile memory may also be utilized such as a hard disk. Additional devices may communicate via the interconnection network 604, such as multiple CPUs and/or multiple system memories.

Additionally, in some embodiments, one or more of the processors 602 have access to one or more caches (which include private and/or shared caches) and associated cache controllers (not shown). The cache(s) may adhere to one or more cache coherent protocols. The cache(s) may store data (e.g., including instructions) that are utilized by one or more components of the system 600.

For example, the cache locally caches data stored in a memory 612 for faster access by the components of the processors 602. In an embodiment, the cache (that may be shared) includes a mid-level cache and/or a last level cache (LLC). Also, each processor 602 may include a level 1 (L1) cache. Various components of the processors 602 can communicate with the cache directly, through a bus or interconnection network, and/or a memory controller or hub. Also, each of the processors 602 (or each core present in the processors 602) include the LWM logic 120 and/or logic 122 in some embodiments.

The MCH 608 also includes a graphics interface 614 that communicates with a display device 616, e.g., via a graphics accelerator. In one embodiment of the invention, the graphics interface 614 communicates with the graphics accelerator via an accelerated graphics port (AGP). In an embodiment of the invention, the display 616 (such as a flat panel display) communicates with the graphics interface 614 through, for example, a signal converter that translates a digital representation of an image stored in a storage device such as video memory or system memory into display signals that are interpreted and displayed by the display 616. The display signals produced by the display device pass through various control devices before being interpreted by and subsequently displayed on the display 616.

A hub interface 618 allows the MCH 608 and an input/output control hub (ICH) 620 to communicate. The ICH 620 provides an interface to I/O devices that communicate with the computing system 600. The ICH 620 communicates with a bus 622 through a peripheral bridge (or controller) 624, such as a peripheral component interconnect (PCI) bridge, a universal serial bus (USB) controller, or other types of peripheral bridges or controllers.

The bridge 624 provides a data path between the CPU 602 and peripheral devices. Other types of topologies can be utilized. Also, multiple buses communicate with the ICH 620, e.g., through multiple bridges or controllers. Moreover, other peripherals in communication with the ICH 620 include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 communicates with an audio device 626, one or more disk drive(s) 628, and/or a network interface device 630 (which is in communication with the computer network 603). Other devices communicate via the bus 622 in some embodiments. Also, various components (such as the network interface device 630) communicate with the MCH 608 in some embodiments of the invention. In addition, the processor 602 and one or more components of the MCH 608 can be combined to form a single chip.

Furthermore, the computing system 600 includes volatile and/or nonvolatile memory (or storage). For example, nonvolatile memory includes one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, and/or other types of nonvolatile machine-readable media that are capable of storing electronic data (e.g., including instructions).

Figure 7:
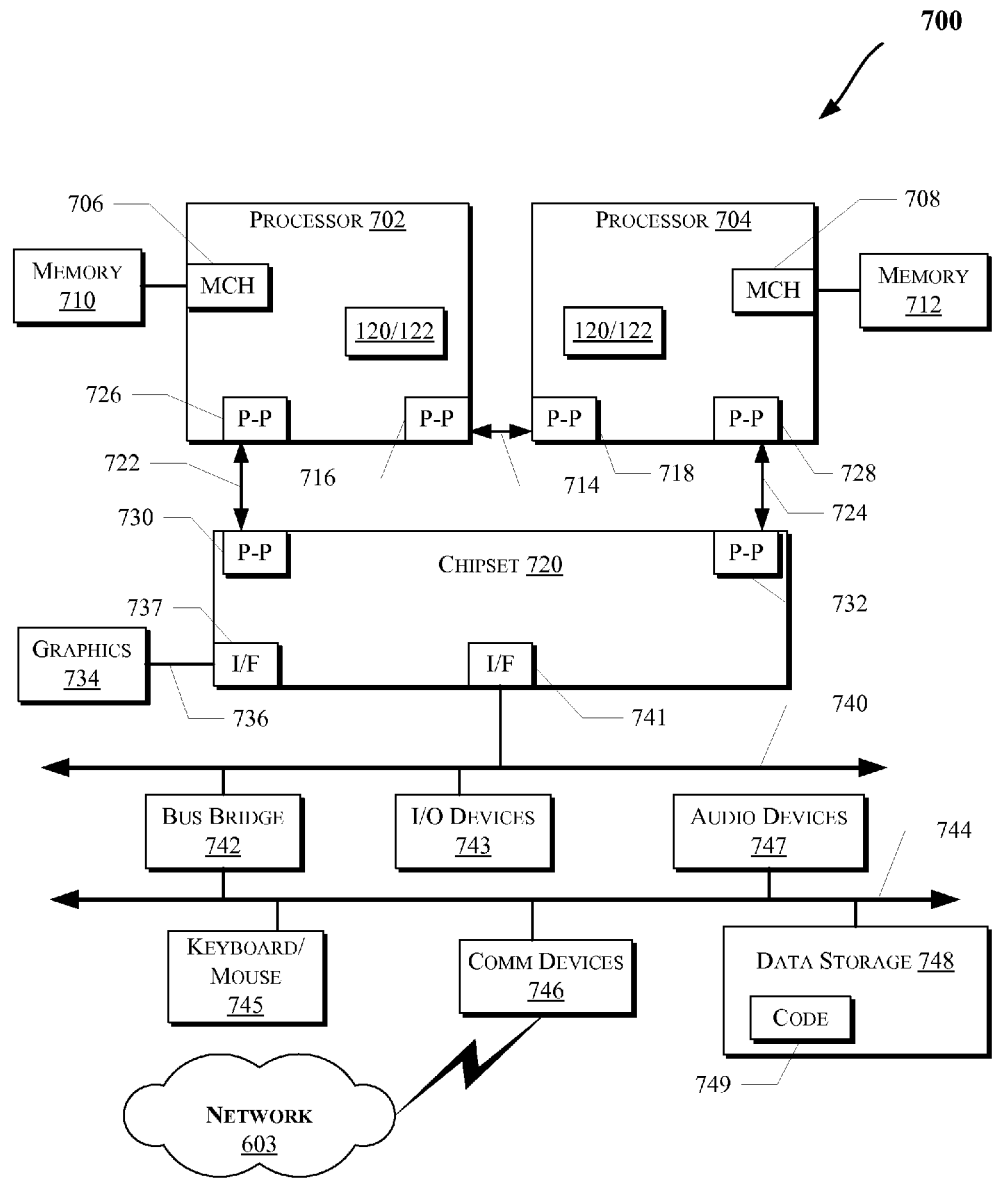
FIG. 7 illustrates a block diagram of and embodiment of a computing system, which may be utilized to implement various embodiments discussed herein.

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. One or more of the operations discussed with reference to FIGS. 1-6 are performed by one or more components of the system 700.

As illustrated in FIG. 7, the system 700 includes several processors, of which only two, processors 702 and 704 are shown for clarity. The processors 702 and 704 each include a local memory controller hub (MCH) 706 and 708 to enable communication with memories 710 and 712. The memories 710 and/or 712 store various data such as those discussed with reference to the memory 612 of FIG. 6. The processors 702 and 704 can also include the cache(s) discussed with reference to FIG. 6.

In an embodiment, the processors 702 and 704 are one of the processors 602 discussed with reference to FIG. 6. The processors 702 and 704 exchange data via a point-to-point (PtP) interface 714 using PtP interface circuits 716 and 718, respectively. Also, the processors 702 and 704 each exchange data with a chipset 720 via individual PtP interfaces 722 and 724 using point-to-point interface circuits 726, 728, 730, and 732. The chipset 720 exchanges data with a high-performance graphics circuit 734 via a high-performance graphics interface 736, e.g., using a PtP interface circuit 737.

At least one embodiment of the invention is provided within the processors 702 and 704 or chipset 720. For example, the LWM logic 120 and fast deskew logic 122 are provided within the processors 702 and 704 (or within each core of the processors 702 and/or 704). Other embodiments of the invention, however, can exist in other circuits, logic units, or devices within the system 700 of FIG. 7. Furthermore, other embodiments of the invention can be distributed throughout several circuits, logic units, or devices illustrated in FIG. 7.

The chipset 720 communicates with a bus 740 using a PtP interface circuit 741. The bus 740 communicates with one or more devices, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device, and/or a data storage device 748. The data storage device 748 stores code 749 that is executed by the processors 702 and/or 704.

In various embodiments of the invention, the operations discussed herein, e.g., with reference to FIGS. 1-7, are implemented as hardware (e.g., circuitry), software, firmware, microcode, or combinations thereof, which can be provided as a computer program product, e.g., including a (e.g., non-transitory) machine-readable or (e.g., non-transitory) computer-readable medium having stored thereon instructions (or software procedures) used to program a computer to perform a process discussed herein.

Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method comprising:
    transmitting a wake signal at a first point in time to cause one or more idle lanes of a link, coupled between a first agent and a second agent, to enter an active state; and transmitting training sequences over the one or more idle lanes of the link at a second point in time that is subsequent to the first point in time;
wherein the one or more idle lanes are deskewed in response to the training sequences and prior to a third point in time that is subsequent to the second point in time.

2. The method of claim 1, further comprising transmitting a deskew sequence on at least one of: all of the one or more idle lanes and one or more active lanes of the link, while the one or more idle lanes are deskewed.

3. The method of claim 1, further comprising transmitting at least one of: one or more special flits and one or more data flits on one or more active lanes of the link, while the one or more idle lanes are deskewed.

4. The method of claim 1, further comprising transmitting a deskew sequence on at least one of: all of the one or more idle lanes and one or more active lanes of the link to cause merging of the one or more idle lanes for communication of data flits on at least one of: all of the one or more idle lanes and the one or more active lanes of the link.

5. The method of claim 1, further comprising modifying latency of a pipeline of the one or more idle lanes when merging the one or more idle lanes and one or more active lanes of the link at the third point in time that is subsequent to the second point in time.

6. The method of claim 1, further comprising transmitting the training sequences over the one or more idle lanes of the link at the first point in time.

7. The method of claim 1, further comprising transmitting at least one of: special flits and data flits on one or more active lanes of the link at the first point in time.

8. The method of claim 1, further comprising transitioning the link from a first width to a second width in response to a power management flit.

9. The method of claim 1, wherein the link comprises a point-to-point interconnect.

10. The method of claim 5, wherein modifying the latency of the pipeline of the one or more idle lanes is performed by rearranging a plurality of buffers in the pipeline.

11. A processor comprising:
logic to transmit a wake signal at a first point in time to cause one or more idle lanes of a link to enter an active state; and
logic to transmit training sequences over the one or more idle lanes of the link at a second point in time that is subsequent to the first point in time,
wherein the one or more idle lanes are deskewed in response to the training sequences and prior to a third point in time that is subsequent to the second point in time.

12. The processor of claim 11, further comprising logic to transmit a deskew sequence on at least one of: all of the one or more idle lanes and one or more active lanes of the link, while the one or more idle lanes are deskewed.

13. The processor of claim 11, further comprising logic to transmit at least one of: one or more special flits and one or more data flits on one or more active lanes of the link, while the one or more idle lanes are deskewed.

14. The processor of claim 11, further comprising logic to transmit a deskew sequence on at least one of: all of the one or more idle lanes and one or more active lanes of the link to cause merging of the one or more idle lanes for communication of data flits on at least one of: all of the one or more idle lanes and the one or more active lanes of the link.

15. The processor of claim 11, further comprising logic to merge the one or more idle lanes and one or more active lanes of the link at the third point in time that is subsequent to the second point in time.

16. The processor of claim 11, further comprising logic to transmit the training sequences over the one or more idle lanes of the link at the first point in time.

17. The processor of claim 11, further comprising logic to transmit at least one of: one or more special flits and one or more data flits on one or more active lanes of the link at the first point in time.

18. The processor of claim 11, further comprising logic to transition the link from a first width to a second width in response to a power management flit.

19. The processor of claim 11, wherein the link comprises a point-to-point interconnect.

20. The processor of claim 11, wherein the processor comprises a plurality of processor cores.

21. The processor of claim 11, wherein the processor is coupled to a processor socket.

22. A computing system comprising:
a first processor core and a second processor core coupled via a link; and
logic to transmit a wake signal, from the first processor core to a second processor core over the link, at a first point in time to cause one or more idle lanes of the link to enter an active state; and
logic to transmit training sequences over the one or more idle lanes of the link at a second point in time that is subsequent to the first point in time,
wherein the one or more idle lanes are deskewed in response to the training sequences and prior to a third point in time that is subsequent to the second point in time.

23. The system of claim 22, further comprising logic to transmit a deskew sequence on at least one of: all of the one or more idle lanes and one or more active lanes of the link, while the one or more idle lanes are deskewed.

24. The system of claim 22, further comprising logic to transmit at least one of: one or more special flits and one or more data flits on one or more active lanes of the link, while the one or more idle lanes are deskewed.

25. The system of claim 22, further comprising logic to transmit a deskew sequence on at least one of: all of the one or more idle lanes and one or more active lanes of the link to cause merging of the one or more idle lanes for communication of data flits on at least one of: all of the one or more idle lanes and the one or more active lanes of the link.

26. The system of claim 22, further comprising logic to merge the one or more idle lanes and one or more active lanes of the link at the third point in time that is subsequent to the second point in time.

27. The system of claim 22, further comprising logic to transmit the training sequences over the one or more idle lanes of the link at the first point in time.

28. The system of claim 22, further comprising logic to transmit at least one of: special flits and data flits on one or more active lanes of the link at the first point in time.

29. The system of claim 22, further comprising logic to transition the link from a first width to a second width in response to a power management flit.

30. The system of claim 22, wherein the link comprises a point-to-point interconnect.

31. The system of claim 22, wherein a processor comprises the first processor core and the second processor core.

32. An apparatus comprising:
logic to transmit a first flit to indicate one or more lanes of an interconnect fabric are to enter an active state at a first point;
logic to transmit a second flit on at least an active lane of the interconnect fabric at a second point, which is subsequent to the first point;
logic to initiate a training sequence on the one or more lanes of the interconnect fabric at a third point that is contemporaneously related to the second point, wherein the training sequence is utilized for deskewing the one or more lanes of the interconnect fabric before the one or more lanes and at least the active lane are merged at a fourth point that is subsequent to the third point.

33. The apparatus of claim 32, further comprising logic to transmit at least one of: one or more special flits and one or more data flits on the one or more lanes, while the one or more idle lanes are deskewed.

34. The apparatus of claim 32, further comprising logic to transmit at least one of: one or more special flits and one or more data flits on the one or more lanes at the first point.

\* \* \* \* \*